Aug. 24, 1965     G. MARULLO ETAL     3,202,713
PROCESS FOR THE SEPARATION OF ETHYLENEDIAMINE
FROM A CRUDE PRODUCT
Filed Sept. 12, 1960
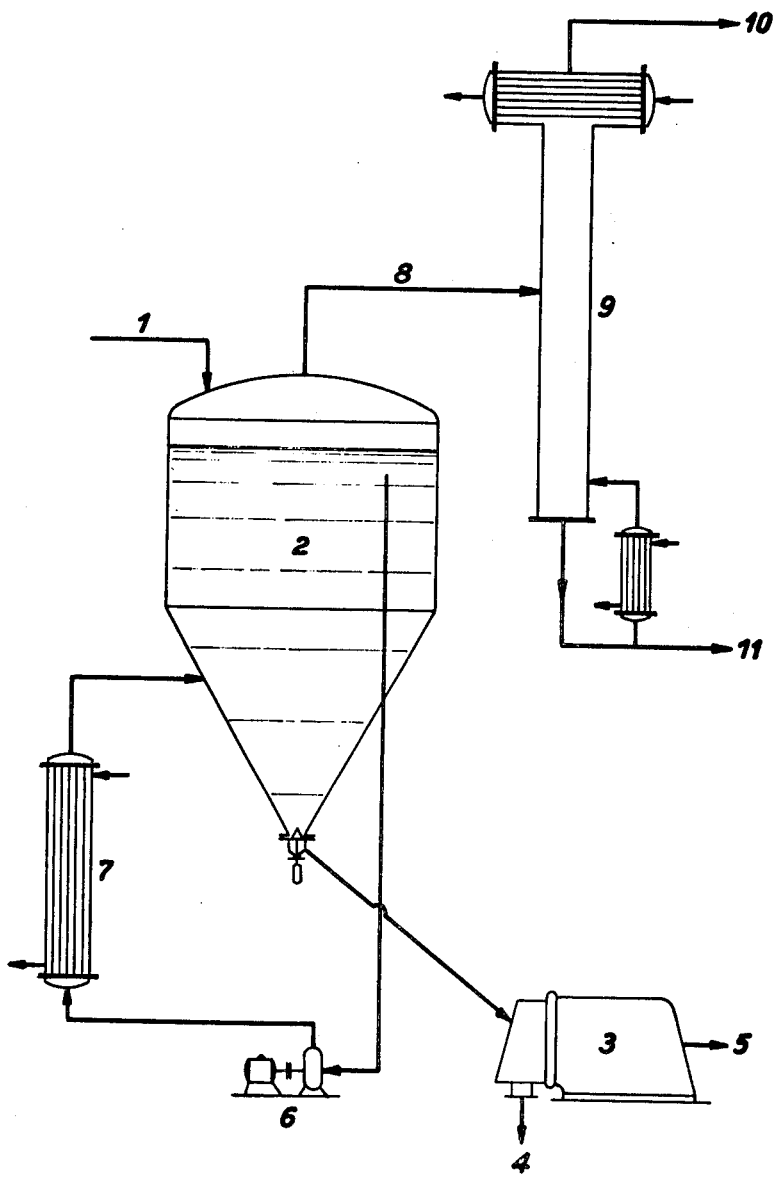

United States Patent Office 3,202,713
Patented Aug. 24, 1965

3,202,713
PROCESS FOR THE SEPARATION OF ETHYLENE-DIAMINE FROM A CRUDE PRODUCT
Gerlando Marullo, Dino Costabello, Gioacchino Boffa, Eraldo Fornasieri, and Giovanni Maiorano, all of Novara, Italy, assignors to Montecatini Società Generale per l'Industria Mineraria e Chimica, Milan, Italy
Filed Sept. 12, 1960, Ser. No. 55,255
Claims priority, application Italy, Sept. 25, 1959, 16,025/59
3 Claims. (Cl. 260—583)

The present invention relates to a method for separation of ethylenediamine from a crude product, particularly that obtained in a reaction between ethylene dichloride and ammonia.

When the reaction is carried out in aqueous solution, a crude product, comprising ethylene diamine hydrochloride together with higher ethylene amines, ammonium chloride, ammonia and water, is obtained.

A process for separating ethylenediamine from the crude product above mentioned is described in Ullmanns Encyclopädie, vol. III, page 134 (1953). Upon adding NaOH to the crude product, the ammonia is freed from ammonium chloride and the amines from hydrochlorides with simultaneous formation of sodium chloride. Upon heating, the crude product is completely freed from the ammonia. A 20% aqueous solution of ethylenediamine is distilled in a forced circulation evaporator, a temperature of 130° C. being reached in the boiler. The salt precipitated in the evaporator is separated by centrifuging. The filtrate containing the amines is rectified. At first, i.e. up to 120° C., concentrated ethylenediamine is obtained under atmospheric pressure. Subsequently crude diethylenetriamine is obtained at up to 120° C./6–8 mm. Hg. Finally, crude triethylenetetramine is obtained at up to 135° C. at 6–8 mm. Hg. Ethylenediamine in 78% concentration can be obtained from its fractions by distilling it in a plate tower. Following the procedure of Barbieri and Heard (U.S.P. 2,113,640), the water in excess is removed from the crude product in a drum-drier. Then the crude product is fed into a distilling boiler, sodium hydroxide being added and ethylenediamine and higher amines distilled, the sodium chloride being discharged as residue at the end of the run.

Following the procedure of Monackin (U.S.P. 2,049,467) water is evaporated and salts contained therein (NH$_4$Cl and amine hydrochlorides) crystallize. Said salts are treated with alkali and converted to amines which are distilled.

Proceeding according to Barbieri (U.S.P. 2,078,555) the concentrated solution is passed into a heated boiler which contains an inert oil having a high boiling point. At first water is removed by distillation; subsequently dried sodium hydroxide is added, and the amines which boil at a temperature between 117 and 135° C. are distilled. Finally, the amines boiling over at 135° C. are distilled, under vacuum. Sodium halide remains in the boiler and is separated from the oil by washing it with water. The greatest difficulty in separating ethylenediamine is in removing sodium chloride, which is present in large amounts, namely about 2 parts by weight of NaCl to 1 part of the formed amines. The methods described above do not provide a satisfactory solution of the problem, since they have one or more weak points.

In the Ullmann method the suspension from which the salt is centrifuged contains a large amount of ethylenediamine, and therefore ethylenediamine is lost together with the salt. Moreover, rectification of the centrifuged amines is difficult because of the precipitation of the remaining sodium chloride. In the Barbieri and Heard method the commonly used metal apparatus cannot be employed to concentrate the crude product before neutralizing it. It is therefore necessary to use ceramic materials or special and costly metal materials, because of the high corrosive action of the concentrated hydrochlorides. And further, the distillation of amines is difficult owing to the deposit of sodium chloride which has to be removed at the end of the operation. The Monackin method has the same drawbacks as the Barbieri and Heard process. In the Barbieri method a foreign liquid, such as oil, is circulated. This causes unavoidable pollution of the amines and difficulties in the subsequent rectification. Moreover, the salt cannot be separated by centrifuging, filtration, etc., owing to the unavoidable losses of oil, so that it is necessary to extract it with water. Washing with water also removes the amines, which are unavoidably present in the oil.

The present invention provides a method for the separation of the amines from the crude product in which the above-mentioned disadvantages are avoided. In our process, ethylenediamine is separated without losses. The rectification of the amines is carried out in the presence of salt, and scale formation in the concentrator, ordinarily caused by the sodium chloride, is avoided. According to our process, as illustrated in the accompanying drawing, the crude neutralized solution is fed through line 1 into a concentrator 2 which is kept at a temperature which causes the water, ethylenediamine, and polyamines (PA) to evaporate completely. Sodium chloride separates in the bath. NaCl suspension is periodically or continuously sent to the centrifuge 3, the salt separated at 4 from the liquid is removed at 5, which liquid is again sent to the concentrator. The liquid of the bath is kept under forced circulation by means of the pump 6, through the heater 7. The vapors 8 leaving the concentrator are continuously fed into a column 9 from which steam is separated at 10 as head product, and EDA and polyamines as tails at 11. The separation of the amines is carried out in a second distiller without danger of scale formation. The concentrator bath consists substantially of polyamines obtained from the reaction either of a concentrated NaOH solution (30–40% NaOH) or of a mixture of said polyamines and concentrated NaOH solution depending on the working conditions of the plant. Operating at atmospheric pressure, the concentration temperature is 130° C., to completely evaporate ethylenediamine, PA, and water from the crude product. In this case, the crude product is carefully neutralized, otherwise a large amount of NaOH is accumulated, which is highly corrosive to the materials (stainless steel) of which the apparatus is made. After a certain running period, the bath consists substantially of polyamines and water. If the crude product contains a little excess of NaOH, added in order to free all of the ammonia, an aqueous caustic layer is formed below the oily polyamine layer. In this case, during the centrifuging of the salt, the aqueous layer of the filtrate is used to neutralize the crude product. Thus, an accumulation of NaOH in the aqueous layer is avoided. By working under reduced pressure, it is possible to keep the concentrator at a lower temperature, for instance at 75° C. under 40 Torr, to carry out the entire evaporation. In this case, the crude product can contain a small excess of NaOH. An accumulation of NaOH then occurs, which however corrodes only slowly, due to the low temperature. After a certain period of time, the bath consists of a concentrated NaOH solution (about 40%).

Our method can be also applied in the separation of EDA (ethylenediamine) obtained under anhydrous conditions, namely by reaction between liquid ethylene dichloride and anhydrous liquid ammonia. In this case also, the crude product is generally neutralized with aqueous NaOH solution, a crude neutral product being obtained, containing water, sodium chloride, EDA and PA as the above-mentioned crude products.

To illustrate our invention two preferred embodiments will now be described, without intent to limit the invention thereto:

Example 1

The crude product, carefully neutralized with sodium hydroxide, is continuously fed into a concentration-crystallization apparatus. The composition of the fed product is the following:

| | Percent |
|---|---|
| $H_2O$ | 71.2 |
| NaCl | 19.4 |
| EDA | 7.0 |
| PA | 2.4 |

The temperature of the liquid in the concentrator rises little by little up to 130° C., which is the operating temperature at which all the amines are obtained in vapor phase. The composition of the boiling liquid is as follows:

| | Percent by weight |
|---|---|
| PA | 77.0 |
| $H_2O$ | 16.0 |
| NaCl | 3.8 |
| EDA | 3.2 |

The volume of the bath remains constant in time; i.e., there is no accumulation of polyamines. The bath is also chemically stable. Only a small percentage of pitches is present therein, which does not increase in time. Sodium chloride crystals separate in the bath, and grow after a certain period of standing. Said growth is obtained by means of a bath having a volume of at least 2 cubic meters for the production of 1 ton per day of ethylenediamine. If the operation is with a bath having a lower volume, and therefore with lower standing periods, smaller crystals are obtained which are centrifuged with difficulty. In order to avoid scales, it is necessary that the concentration of the suspended NaCl be higher than 15% (NaCl g./100 gr. suspension). When circulating with a propeller pump, we have found that the optimum NaCl concentration is at 40%. The suspension is continuously withdrawn from the bottom of the concentrator and is centrifuged, and the filtrate is sent again to the boiler. During the centrifuging it is sufficient to wash with a small amount of water, because the liquid adhering to NaCl consists essentially of PA, containing a very small amount of ethylenediamine. Also the washing liquid is sent again to the concentrator. The vapors leaving the concentrator consist of:

| | Percent |
|---|---|
| $H_2O$ | 88.0 |
| Ethylenediamine | 9.0 |
| PA | 3.0 |
| | 100.0 |

Said vapors are directly sent to a continuous column under atmospheric pressure at 100° C. from which, as head product, chiefly steam free of ethylenediamine is discharged. The amines, together with residual water, are obtained as tails. The tails have the following composition:

| | Percent |
|---|---|
| $H_2O$ | 26.4 |
| Ethylenediamine | 55.2 |
| PA | 18.4 |
| | 100.0 |

The tails are discontinuously distilled off in a plate tower wherein ethylenediamine is obtained as azeotrope with water (78% EDA) and the various polyamines are obtained afterwards.

Example 2

The crude product, as in Example 1, which contains a small excess of caustic soda, is continuously fed into the above-described concentration-crystallization apparatus. The working pressure is 40 Torr; the liquid in the concentrator is kept at 75° C. to evaporate all the amines and water of the crude product. Under uniform conditions, two layers are present, the upper of which is very small in respect to the lower. The upper oily layer consists of:

| | Percent |
|---|---|
| $H_2O$ | 32.0 |
| NaOH | 3.2 |
| NaCl | 5.6 |
| Ethylenediamine | 1.5 |
| PA | 57.7 |
| | 100.0 |

The lower aqueous layer consists of:

| | Percent |
|---|---|
| $H_2O$ | 54.0 |
| NaOH | 40.0 |
| NaCl | 4.0 |
| Ethylenediamine | 0.5 |
| PA | 1.5 |
| | 100.0 |

Sodium chloride separates in the lower layer, which is tapped and centrifuged to remove NaCl. In this way, neither EDA nor PA are lost since the aqueous layer contains only a very small amount thereof. During the centrifuging, sodium chloride is washed with a small amount of water in order to recover the adhering alkaline solution which is sent again to the concentrator. The gases leaving the concentrator, which consist of $H_2O$, ethylenediamine and PA, are passed to a continuous fractionating tower under 404 Torr. vacuum at 30° C.; the water exists at the top of the tower, EDA and PA being discharged at the bottom.

We claim:

1. In a process of making ethylenediamine by reacting ammonia and ethylene dichloride, to form a crude product containing ammonium hydrochloride and amine hydrochloride, the improvement consisting of reacting the crude product with sodium hydroxide to free the ammonia and amine, and form sodium chloride, water being present, continuously concentrating the resulting mixture by evaporating water, ammonia, and ethylenediamine at a temperature between 70° to 140° C. and pressure substantially not greater than atmospheric to leave sodium chloride crystals in a sodium hydroxide medium, separating sodium chloride from said sodium hydroxide medium, passing the evaporated water, ammonia and amines to a continuous distillation zone in which the water is separated as steam and the amines as tails, and recycling the sodium hydroxide medium to react with additional crude product.

2. In a process of making ethylenediamine by reacting ammonia and ethylene dichloride, to form a crude product containing ammonium hydrochloride and amine hydrochloride, the improvement consisting of (a) continuously recovering ethylenediamine by removing and reacting the crude product with sodium hydroxide to free the ammonia and amines, and form sodium chloride, water being present, (b) continuously concentrating the resulting mixture by evaporating water, ammonia, and amines including ethylenediamine, said evaporation of water, ammonia and diamine being at 70 to 140° C., under a pressure not substantially greater than atmospheric, to obtain optimum vaporization of the ethylenediamine and water, to produce sodium chloride crystals in a sodium hydroxide medium, (c) separating said sodium chloride crystals, (d) passing the gaseous mixture of water vapor, ammonia and amines to a continuous distillation zone in which the water is separated as steam and the amines as tails, the zone being at a temperature below that at which said amines vaporize, and (e) recycling the sodium hydroxide medium to react with additional crude product.

3. In a process of making ethylenediamine by reacting ammonia and ethylene dichloride, to form a crude product containing ammonium hydrochloride and amine hydrochloride, the improvement consisting of reacting the crude product with sodium hydroxide to free the ammonia and amines, and form sodium chloride, water being present, continuously concentrating the resulting mixture by evaporating water, ammonia, and ethylenediamine to leave a concentrated sodium chloride slurry, said evaporation of water, ammonia and diamine being at 130° C., under atmospheric pressure, to obtain optimum vaporization of the ethylenediamine and water, separating the sodium chloride from said slurry, and recycling the sodium hydroxide medium remaining to react with additional crude product.

References Cited by the Examiner
UNITED STATES PATENTS

| 2,028,041 | 8/31 | Bersworth | 260—583 |
| 2,268,620 | 1/42 | Rigby | 260—583 X |

FOREIGN PATENTS 735,779    8/55    Great Britain.

CHARLES B. PARKER, *Primary Examiner.*
LEON ZITVER, *Examiner.*